United States Patent [19]

Imanishi

[11] Patent Number: 4,661,912
[45] Date of Patent: Apr. 28, 1987

[54] NUMERICAL CONTROL DEVICE FOR SCHEDULING MACHINING OF GROUPS OF WORKPIECES

[75] Inventor: Kazuo Imanishi, Aichi, Japan

[73] Assignee: Mitsubishi Denki Kabushiki Kaisha, Tokyo

[21] Appl. No.: 579,050

[22] Filed: Feb. 10, 1984

[30] Foreign Application Priority Data

Feb. 10, 1983 [JP] Japan ................... 58-20771

[51] Int. Cl.$^4$ ................... G06F 15/46; G05B 15/08; B24B 49/00; G07C 3/00
[52] U.S. Cl. ................... 364/474; 364/468; 364/132; 364/475; 29/568; 51/165.71; 377/16
[58] Field of Search ............... 364/191, 192, 193, 194, 364/140, 474, 178, 134, 475, 468, 167, 170, 132; 318/567, 568; 377/16; 29/568; 414/134, 135

[56] References Cited

U.S. PATENT DOCUMENTS

| 3,916,165 | 10/1975 | Komsa ................... 377/16 |
| 4,100,597 | 7/1978 | Fleming et al. ................... 364/474 |
| 4,142,238 | 2/1979 | Brandt et al. ................... 377/16 |
| 4,237,598 | 12/1980 | Williamson ................... 29/568 |
| 4,314,342 | 2/1982 | McNeir et al. ................... 364/468 |
| 4,472,783 | 9/1984 | Johnstone et al. ................... 364/478 |
| 4,473,883 | 9/1984 | Yoshida et al. ................... 364/474 |
| 4,494,206 | 1/1985 | Imazeki et al. ................... 364/474 |
| 4,498,259 | 2/1985 | Yamamoto et al. ................... 51/165.71 |
| 4,531,826 | 7/1985 | Stoughton ................... 377/16 |
| 4,550,375 | 10/1985 | Sato et al. ................... 364/474 |
| 4,564,913 | 1/1986 | Yomogida et al. ................... 364/474 |

FOREIGN PATENT DOCUMENTS 0163004 9/1983 Japan ................... 364/140

Primary Examiner—Joseph Ruggiero
Assistant Examiner—Jon D. Grossman
Attorney, Agent, or Firm—Sughrue, Mion, Zinn, Macpeak & Seas

[57] ABSTRACT

A numerical control device in which machining operations on a plurality of different groups of workpieces can be automatically carried out. A switch section instructs data representing the required number of machining operations in a machining order for each group of workpieces. This data is stored in a first group of registers. Each time a machining operation for any group of the workpieces is performed, a value stored in a second register is incremented. A machining control section determines a machining schedule according to the contents stored in the first and second registers to thereby carry out the machining of various groups of workpieces in a specified order.

4 Claims, 5 Drawing Figures

FIG. 4

| WORKPIECE NO. | WORKPIECE NAME | NUMBER OF MACHINING OPERATIONS | ORDER OF MACHINING | NUMBER OF ACTUAL MACHINING OPERATIONS |
|---|---|---|---|---|
| 21 | | 50 | 1 | 12 |

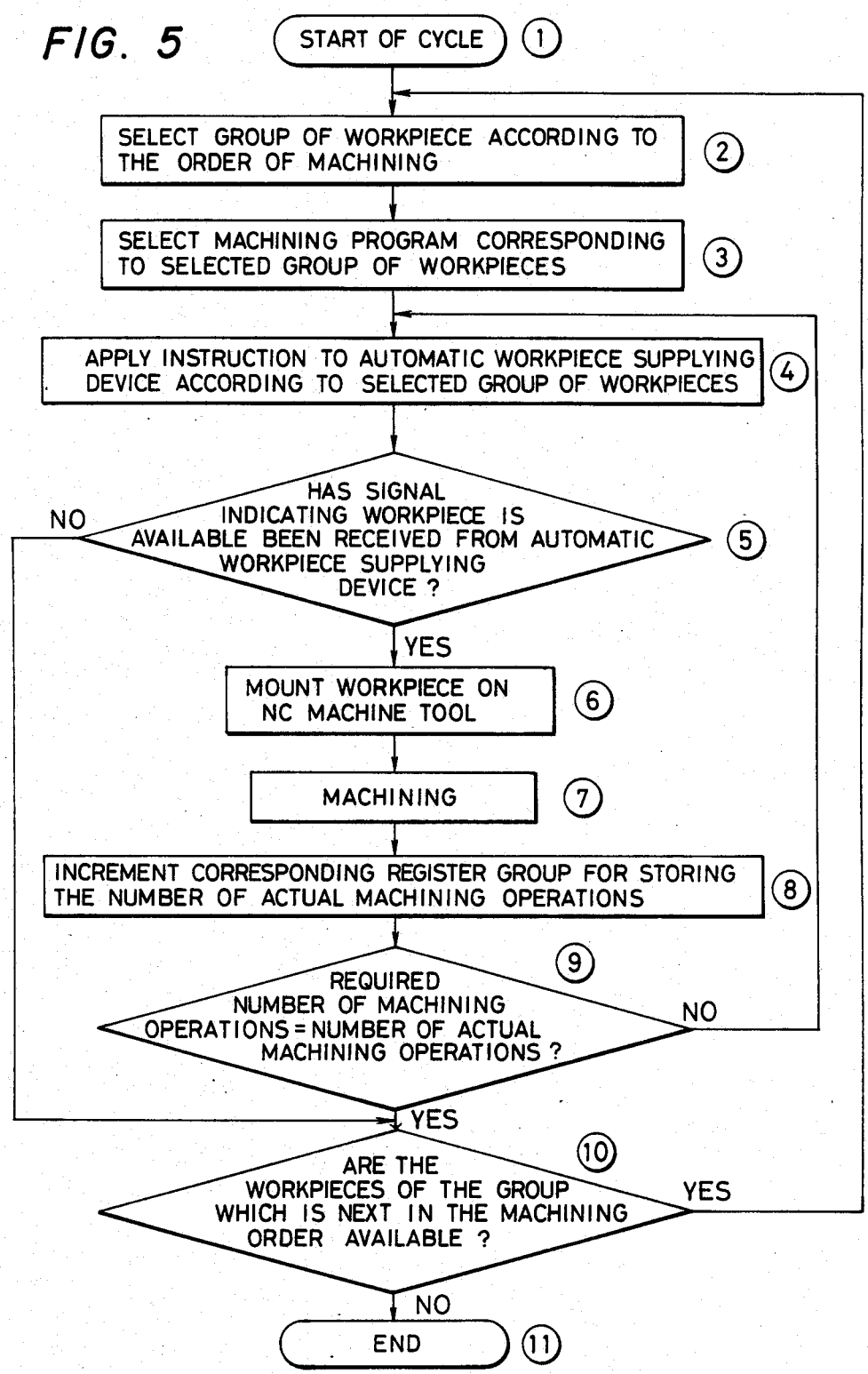

NUMERICAL CONTROL DEVICE FOR SCHEDULING MACHINING OF GROUPS OF WORKPIECES

BACKGROUND OF THE INVENTION

The present invention relates to an NC (Numerical Control) device by which a plurality of machining operations can be automatically performed on a plurality of groups of workpieces.

A conventional numerical control device of the same general type to which the invention relates is shown in FIG. 1. In FIG. 1, reference numeral 1 designates an NC control device; 2, a counter for counting the number of machining operations in response to the output of the NC device 1; 3, a switch device for presetting a required number of machining operations; 4, a machining program tape; 5, a display unit for indicating when a machining operation is accomplished; and 6, an NC machine tool.

In the conventional device, an instruction (MO 2, for instance) identifying the finish of machining is programmed at the end of the machining program tape 4. That instruction is reached after one cycle of machining has been accomplished. A count instruction is then outputted, whereupon the counter 2, which counts the number of machining operations, is incremented. When the count value of the counter 2 reaches the required number of machining operations instructed by the switch device 3, automatic machining is stopped and the display unit 5 is caused to indicate the fact that machining has been ended.

The conventional apparatus has only one counter for counting the number of machining operations for one group of workpieces to be machined at any one time. It cannot simultaneously perform machining operations on a plurality of groups of workpieces since it cannot count the number of actual machining operations in such a case. Furthermore, the conventional apparatus has no provision for specifying the order of machining. Therefore, when a predetermined number of machining operations has been performed on one group of workpieces, the apparatus cannot automatically select a next group of workpieces to continue the machining. That is, whenever a predetermined number of machining operations has been performed on one group of workpieces, a machining program must be separately inputted for the next group of workpieces and the required number of machining operations also must be preset. Therefore, with the conventional apparatus, it is difficult to establish a fully automatic system for a factory which handles small lots.

An object of the invention is thus to provide a numerical control device in which the above-described difficulties accompanying a conventional numerical control device have been eliminated, a desired number of machining operations can be preset for each of a plurality of groups of workpieces, the number of actual machining operations performed on workpieces counted for each group of workpieces, a machining order is set for the groups of workpieces, and machining operations of the groups of workpieces are controlled according to such data, whereby totally automatic machining operations can be carried out.

SUMMARY OF THE INVENTION

The above and other objects of the invention are met by a numerical control device including a memory for storing machining programs for a plurality of groups of workpieces including means for instructing data representing a required number of machining operations and a machining order of each group of workpieces, first register means for storing this data, means for counting a number of actual machining operations for each group of workpieces, second register means for storing numbers of actual machining operations thus counted, and a machining control section. The machining control section determines a machining schedule in accordance with the contents stored in the first and second registers to machine the groups of workpieces as required in the specified machining order. The machining control section specifies, when the machining of one group of workpieces has been completed, the next group of workpieces to be machined, and then causes the second group of workpieces to automatically machined. Accordingly, a plurality of groups of workpieces can be successively machined utilizing the device of the invention.

BRIEF DESCRIPTION OF THE DRAWINGS

FIG. 4 is an explanatory diagram showing an example of a machining control screen display; and FIG. 5 is a flow chart used for a description of the operation of the preferred embodiment of the invention.

DESCRIPTION OF THE PREFERRED EMBODIMENTS

The invention will be described in more detail with reference to the accompanying drawings.

Figure 1:
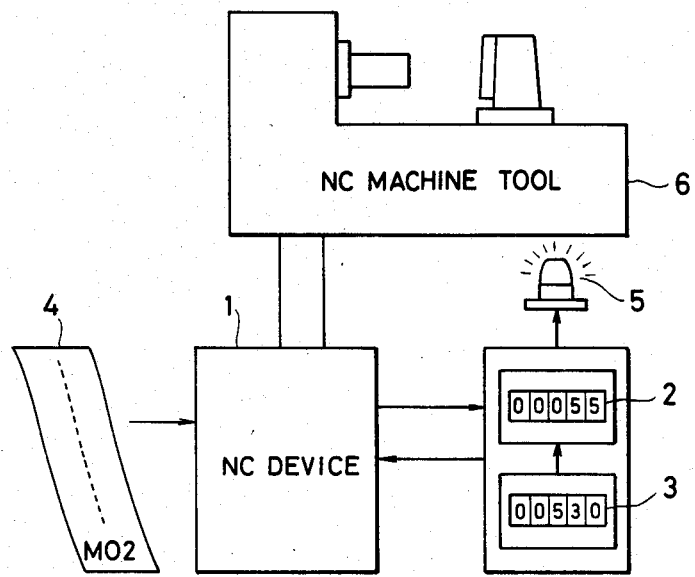
FIG. 1 is an explanatory diagram showing the arrangement of a conventional numerical control device.
Figure 2:
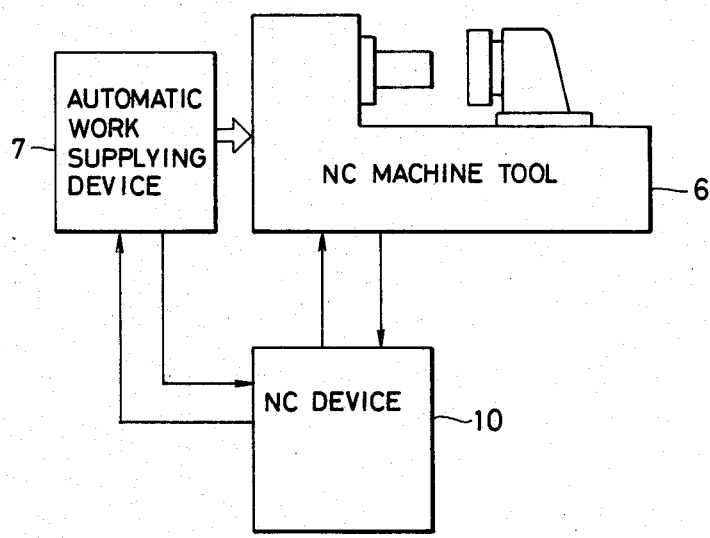
FIG. 2 is an also an explanatory diagram of a preferred embodiment of a numerical control device of the invention.

FIG. 2 shows the arrangement of an NC machine tool according to the invention. In FIG. 2, reference numeral 10 designates an NC device according to the invention; 6, the NC machine tool controlled by the NC device 10; and 7, an automatic workpiece supplying device for supplying workpieces to the NC machine tool 6.

Figure 3:
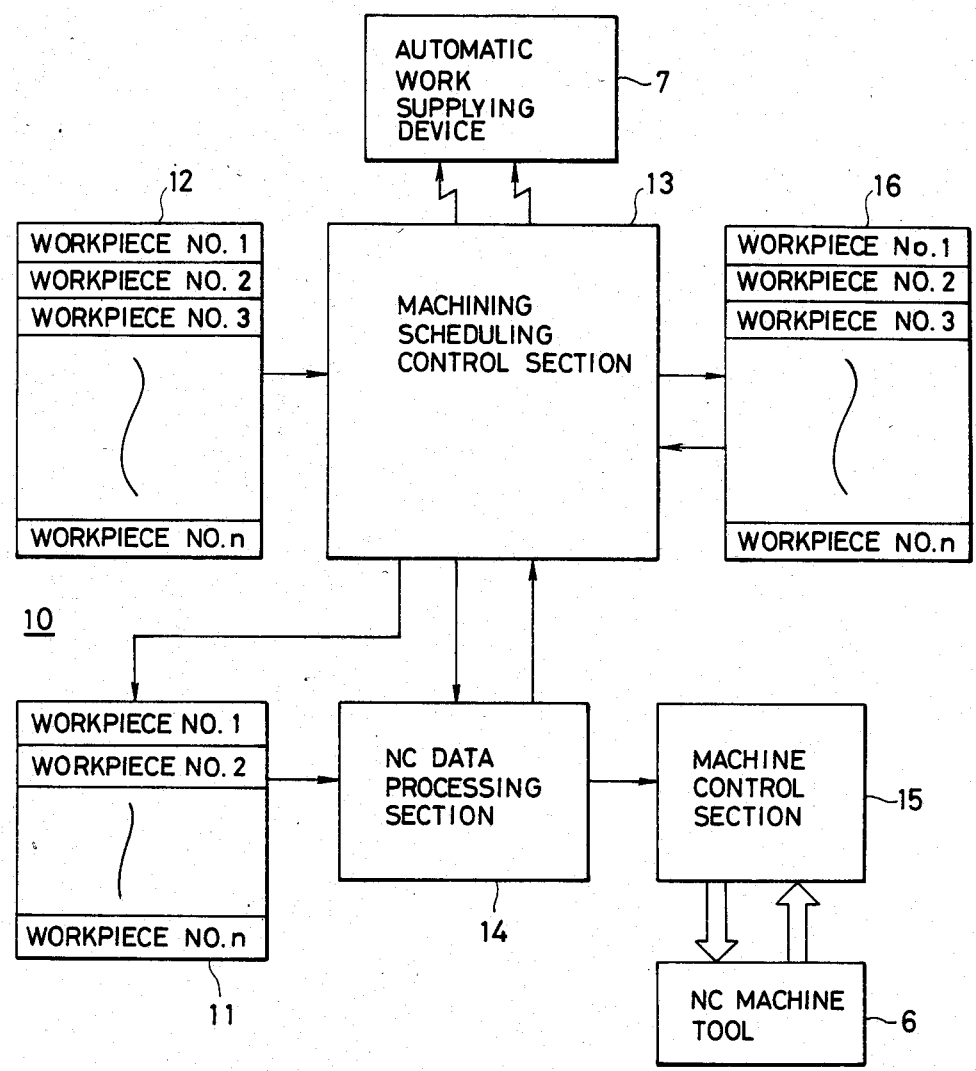
FIG. 3 is a block diagram of the numerical control device of the invention.

FIG. 3 is a block diagram showing a specific example of the NC device 10. In FIG. 3, reference numeral 11 designates a machining program memory; 12, a register group in which are stored the required number of machining operations and the order of machining for plural groups of workpieces; 13, a machining scheduling control section for controlling the machining; 14, an NC data processing section for processing the machining program; 15, a machine control section for controlling the NC machine tool 6 according to processed NC data; 16, a register group for counting the number of actual machining operations of each workpiece and storing the number 6, the NC tool machine; and 7, the automatic workpiece supplying device.

FIG. 4 shows an example of a machining control display on a display unit. Necessary data is indicated at headings "Workpiece No.", "Workpiece name", "Number of Machining Operations", "Order of Machining" and "Actual Number of Machining Operations".

FIG. 5 is a flow chart for the machining scheduling control section, which includes Steps 1 through 11.

The operation of the numerical control device according to the invention will now be described.

Machining programs for a plurality of groups of workpieces for different work orders are stored in the machining program memory 11 in FIG. 3. The number of groups of workpieces to be machined for a day and the order of machining are set and displayed on the display screen as shown in FIG. 4, and this data is stored in the register group 12. Thereafter, the machining start button is depressed to start the machining cycle (Step 1). According to the order of machining, a group of workpieces is selected (Step 2), and then the machining program for the group of workpieces which is in the first order is selected (Step 3). Then, an instruction for supplying the first workpieces is applied to the automatic workpiece supplying device 7 (Step 4), a signal representative of the fact that a workpiece is available is received from the automatic workpiece supplying device 7 (Step 5), and the latter supplies the specified workpiece to the NC machine tool 6. After it is confirmed that the workpiece has been mounted on the NC machine tool 6, machining of the workpiece is started (Step 7). When the machining has been accomplished, the corresponding value stored in the register group 16, in which is stored the number of actual machining operations for each workpiece, is incremented (Step 8). The required number of machining operations which has been set is compared with the number of actual machining operations (Step 9), and if the former is smaller than the latter, an instruction is provided to cause the automatic workpiece supplying device to supply the workpieces in the same group. The workpieces thus supplied are machined in the same manner.

Whenever one machining operation has been completed, the required number of machining operations which has been set is compared with the number of actual machining operations. When the former becomes equal to the latter, the machining program for the group of workpieces which are in the second order is selected and an instruction is applied to the automatic workpiece supplying device 7 to cause the latter to supply the group of workpieces in the second order (Step 10). Thereafter, the machining of the workpieces in the second group is carried out as many times as required. In the same manner, the group of workpieces in the third order is selected. Thus, machining operations in conformance with a machining schedule are automatically and successively carried out. When the automatic workpiece supplying device 7 detects the fact that the workpieces in the group presently being machined have been completed, the NC device 10 is so informed, and thus the machining operation is switched over for workpieces in the next machining order (Step 11).

In the above-described example, the technical concept of the invention is applied to the automation of an NC machine tool equipped with an automatic workpiece supplying device. However, it can be applied to an NC machine tool also which is manually controlled. That is, if the apparatus is so designed that when the number of actual machining operations has reached the required number of machining operations which has been set in advance, an indication is made on the display unit to machine the workpieces of the group in the next order. Then the operator can set the workpieces according to the instruction from the NC device 10 without counting the number of machining operations and he may confirm the number of actual machining operations by referring to the machining control screen.

As is apparent from the above description, in accordance with the invention, the number of machining operations and the order of machining are set for each group of workpieces and the groups of workpieces are machined successively according to the data thus set. Therefore, the invention is effective in the automation of an NC machine tool, especially in the production of small numbers of various articles.

I claim:

1. A numerical control device including a memory for storing machining programs for a plurality of groups of work pieces, comprising:

means for supplying data representing the number of workpieces to be machined in each group and a machining order for each group of workpieces;

first register means for storing said data;

counting means for counting the number of workpieces actually machining for each group of workpieces;

second register means for storing said number of workpieces actually machined from said counting means; and a machining control section for determining a machining schedule according to contents stored in said first and second registers to machine said groups of workpieces as required in said machining order and, when the workpieces in one group of workpieces have been machined in accordance with said data, specifying a next group of workpieces to be machined to cause said groups of workpieces to be automatically machined, whereby said plurality of groups of workpieces are successively machined according to said machining schedule.

2. The numerical control device of claim 1, wherein said means for supplying data comprises switch means.

3. The numerical control device of claim 1 further comprising means for displaying said data representing said number of workpieces to be machined and said machining order for each group of workpieces.

4. The numerical control device of claim 1, further comprising program storage means for storing a plurality of programs, and wherein each of said groups of workpieces is machined in accordance with a respective one of said programs.

* * * * *